United States Patent
Xie et al.

(10) Patent No.: US 8,021,102 B2
(45) Date of Patent: Sep. 20, 2011

(54) COMPOSITE FAN CONTAINMENT CASE AND METHODS OF FABRICATING THE SAME

(75) Inventors: Ming Xie, Beavercreek, OH (US); Michael Scott Braley, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 943 days.

(21) Appl. No.: 11/565,347

(22) Filed: Nov. 30, 2006

(65) Prior Publication Data

US 2008/0128073 A1   Jun. 5, 2008

(51) Int. Cl.
*F01D 25/24* (2006.01)

(52) U.S. Cl. ......... 415/9; 415/200; 415/220; 415/213.1; 29/889.2

(58) Field of Classification Search .............. 415/9, 200, 415/220, 213.1; 29/889.2
See application file for complete search history.

(56) References Cited

U.S. PATENT DOCUMENTS

| | | | |
|---|---|---|---|
| 3,279,967 A * | 10/1966 | Martin, Jr. et al. | 156/172 |
| 4,534,698 A | 8/1985 | Tomich | |
| 4,954,382 A * | 9/1990 | Riefler et al. | 428/116 |
| 5,145,621 A * | 9/1992 | Pratt | 264/102 |
| 5,447,411 A | 9/1995 | Curley et al. | |
| 5,482,429 A | 1/1996 | Penda | |
| 5,486,086 A * | 1/1996 | Bellia et al. | 415/9 |
| 5,885,056 A | 3/1999 | Goodwin | |
| 6,059,524 A | 5/2000 | Costa et al. | |
| 6,149,380 A | 11/2000 | Kuzniar et al. | |
| 6,382,905 B1 | 5/2002 | Czachor et al. | |
| 6,637,186 B1 | 10/2003 | Van Duyn | |
| 6,652,222 B1 | 11/2003 | Wojtyczka et al. | |
| 6,913,436 B2 | 7/2005 | McMillan et al. | |
| 7,018,168 B2 * | 3/2006 | Worthoff et al. | 415/9 |
| 7,335,012 B2 * | 2/2008 | Blanton et al. | 425/388 |
| 7,390,161 B2 * | 6/2008 | Xie et al. | 415/9 |

FOREIGN PATENT DOCUMENTS

GB    2462337 A  *  2/2010

* cited by examiner

*Primary Examiner* — Ninh H Nguyen
(74) *Attorney, Agent, or Firm* — David J. Clement, Esq.; Armstrong Teasdale LLP

(57) ABSTRACT

A method of fabricating a fan containment case for a gas turbine engine is provided. The method includes forming a core layer material, wrapping the core layer material about a cylindrically-shaped take-up spool, and transferring the core layer material to a cylindrically-shaped mandrel by wrapping a plurality of layers of the core layer material about the mandrel such that the mandrel is circumscribed by the layers and such that a size and a cylindrical shape of the fan containment case are defined by the layers of core layer material.

14 Claims, 5 Drawing Sheets

COMPOSITE FAN CONTAINMENT CASE AND METHODS OF FABRICATING THE SAME

BACKGROUND OF THE INVENTION

This invention relates generally to turbine engines, and more particularly, to composite fan containment cases used with turbine engines.

Gas turbine engines typically include high and low pressure compressors, a combustor, and at least one turbine. The compressors compress air which is mixed with fuel and channeled to the combustor. The mixture is then ignited and generates hot combustion gases. The combustion gases are channeled to the turbine which extracts energy from the combustion gases for powering the compressor, as well as producing useful work to propel an aircraft in flight or to power a load, such as an electrical generator.

When engines operate in various conditions, foreign objects may be ingested into the engine. More specifically, various types of foreign objects, such as, but not limited to, large birds, hailstones, sand and/or rain, may be entrained into the inlet of a gas turbine engine. Foreign objects may impact a blade resulting in a portion of the impacted blade being damaged and/or torn loose from a rotor. Such a condition, known as foreign object damage (FOD), may cause the damaged rotor blade to pierce the surrounding engine casing which may result in cracks along an exterior surface of the engine casing, and/or possible injury to nearby personnel. Additionally, the foreign object damage may cause a portion of the engine to bulge or deflect resulting in increased stresses along the entire engine casing.

To facilitate preventing the increased engine stresses and the possible injury to personnel during an FOD event, at least some known engines are assembled with a metallic casing shell that increases the radial and axial stiffness of the engine, and that reduces stresses near the engine casing penetration. However, such casing shells are generally fabricated from a metallic material which increases the overall weight of the engine.

The high specific strength and stiffness of polymeric composite materials offer attractive weight reduction benefits for jet engine components. The majority of current composite components are fabricated with material in a unidirectional tape or woven fabric form. The required properties needed for a specific component are obtained by assembling many layers of the chosen tape or woven fabric into one monolithic shell.

Known methods of fabricating composite fan cases with dry fiber preform may include fiber preforming and preform wrapping, and then resin infusion and curing. Known composite fan cases may also be fabricated with prepreg preform in a similar wrapping process. However, using known methods of fabricating composite fan cases, dry or prepreg fiber preforms must be formed with the same shape as the fan case. Hence, they are also known as conforming fiber preforms. To shape the fiber preforms with the same shape as the fan case, preform take-up spools and the wrapping mandrel, or curing tool, are formed with the same geometry as the fan case. Moreover, the preform take-up spools must have the same geometry as the wrapping mandrel, or the produced fiber preform will not conform to the shape of the mandrel during the preform wrapping process, and wrinkles may form on the composite fan containment case. Wrinkling may reduce the quality of fabricated fan cases. As a result, fabricating conforming fiber preforms may be a difficult and expensive task.

BRIEF DESCRIPTION OF THE INVENTION

In one aspect, a method of fabricating a fan containment case for a gas turbine engine is provided. The method includes forming a core layer material, wrapping the core layer material about a cylindrically-shaped take-up spool, and transferring the core layer material to a cylindrically-shaped mandrel by wrapping a plurality of layers of the core layer material about the mandrel such that the mandrel is circumscribed by the layers and such that a size and a cylindrical shape of the fan containment case are defined by the layers of core layer material.

In another aspect, a fan containment case is provided that includes a core layer material wrapped about and circumscribing a cylindrically-shaped take-up spool. The core layer material is transferred to a cylindrically-shaped mandrel, where a plurality of layers of the core layer material are wrapped about the mandrel such that the mandrel is circumscribed by the layers and such that a size and a cylindrical shape of the fan containment case are defined by the layers of core layer material.

In yet another aspect, another method of fabricating a fan containment case for a turbine engine is provided. The method includes forming a core layer material, wrapping the core layer material about a cylindrically-shaped take-up spool, transferring the core layer material from the cylindrically-shaped take-up spool to a cylindrically-shaped shipping spool, and transferring the core layer material from the cylindrically-shaped shipping spool to a cylindrically-shaped mandrel by wrapping a plurality of layers of the core layer material about the mandrel such that the mandrel is circumscribed by the layers and such that a size and a cylindrical shape of the fan containment case are defined by the layers of core layer material.

DETAILED DESCRIPTION OF THE INVENTION

A composite fan casing for gas turbine engines is described below in detail. In the exemplary embodiment the casing includes a core having a circular cross-sectional shape fabricated from a dry or prepreg fiber preform. Designing the composite casing with a substantially circular cross-section facilitates a technically easier and less expensive fabrication of composite fan containment casings.

Figure 1:
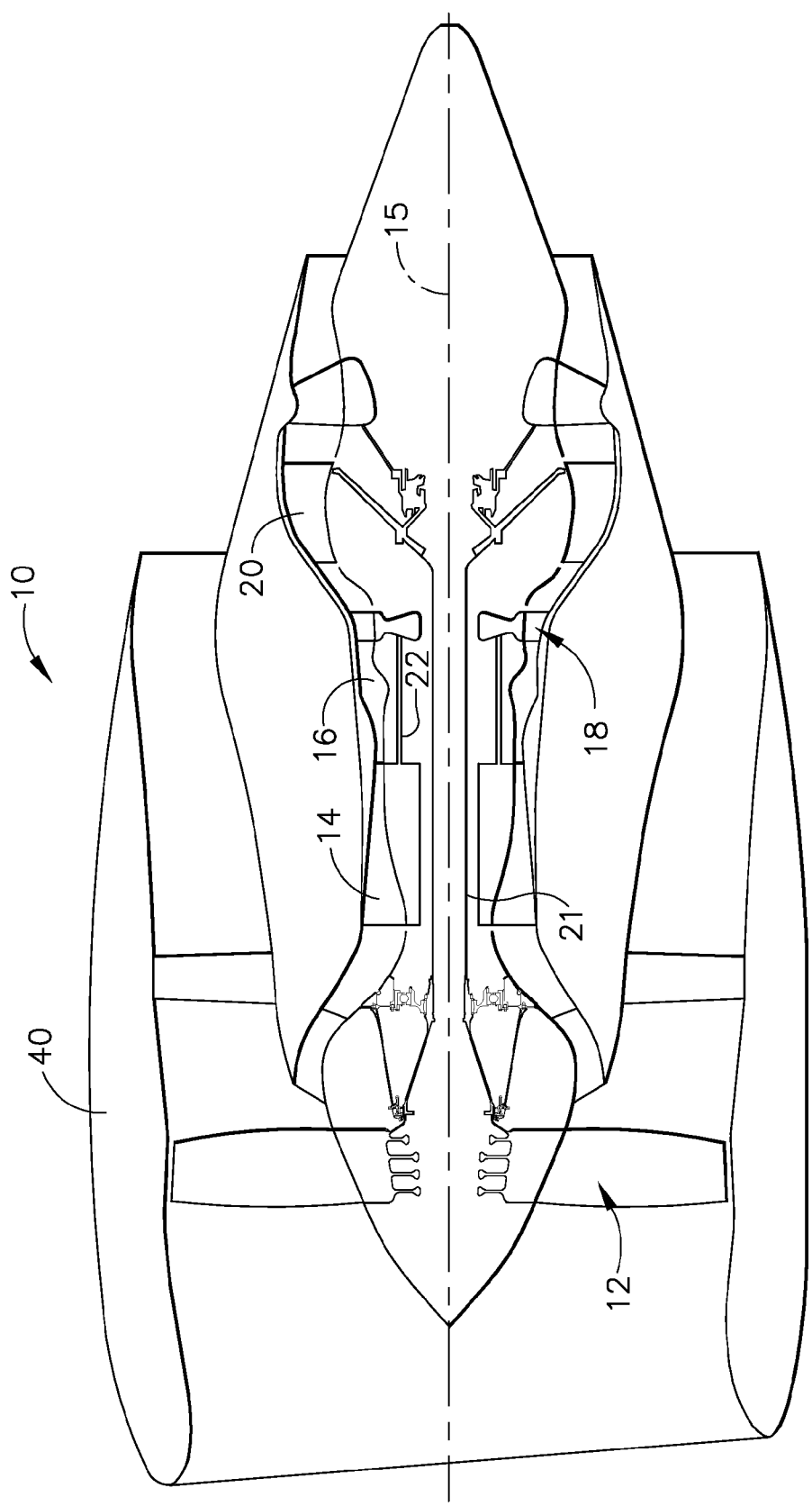
FIG. 1 is schematic illustration of a gas turbine engine including a fan containment case.

FIG. 1 is a schematic illustration of an exemplary gas turbine engine 10. Engine 10 includes a low pressure compressor 12, a high pressure compressor 14, and a combustor assembly 16. Engine 10 also includes a high pressure turbine 18, and a low pressure turbine 20 arranged in a serial, axial flow relationship. Compressor 12 and turbine 20 are coupled by a first shaft 21, and compressor 14 and turbine 18 are coupled by a second shaft 22. In the exemplary embodiment, gas turbine engine 10 is a CFM56 gas turbine engine or CF34-10 that are available from General Electric Company, Cincinnati, Ohio.

During operation, air flows along a central axis 15, and compressed air is supplied to high pressure compressor 14. The highly compressed air is delivered to combustor 16. Airflow (not shown in FIG. 1) from combustor 16 drives turbines 18 and 20, and turbine 20 drives low pressure compressor 12 by way of shaft 21. Gas turbine engine 10 also includes a fan containment case 40.

Figure 2:
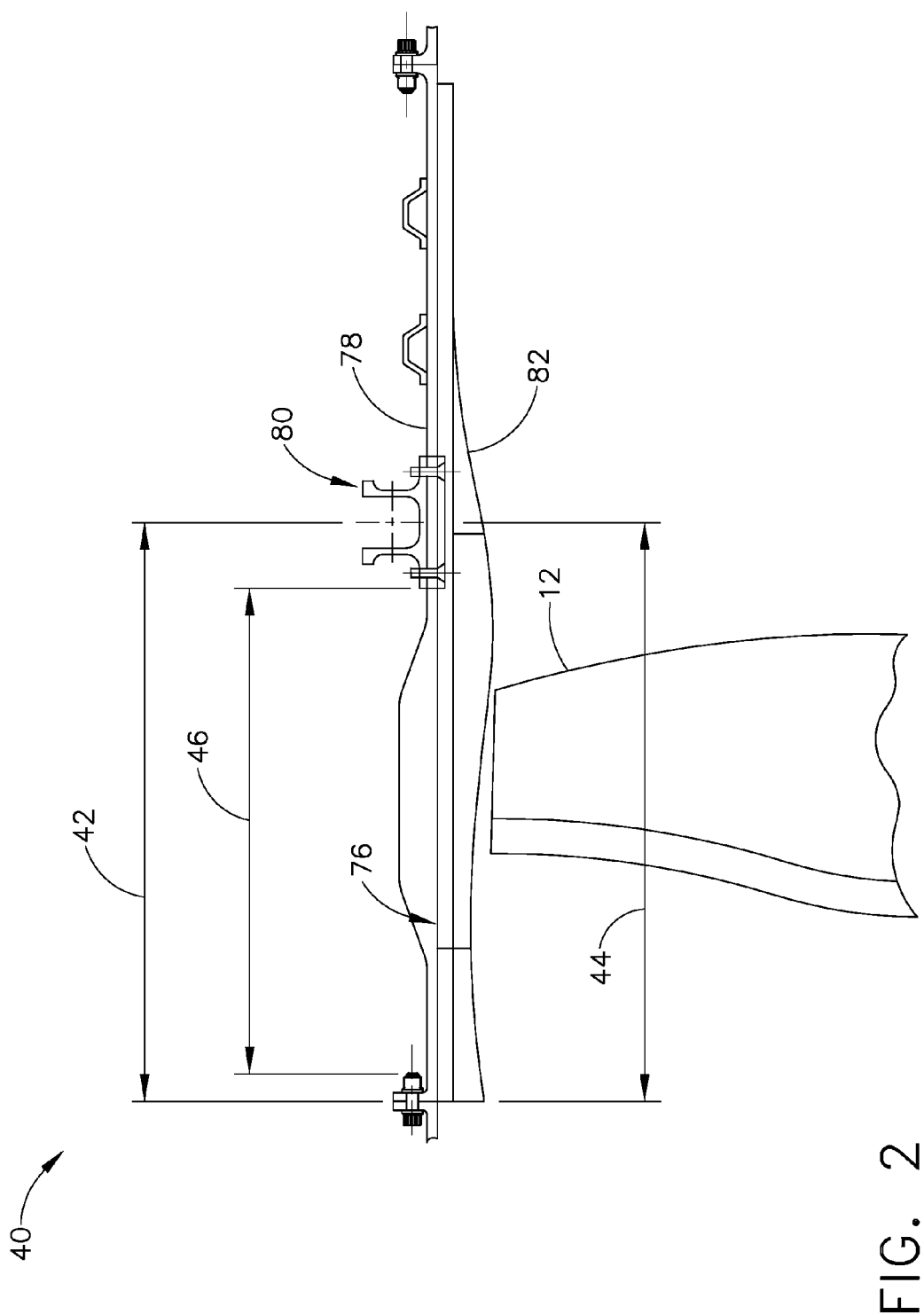
FIG. 2 is a schematic cross-section illustration of a portion of the fan containment case shown in FIG. 1.
Figure 3:
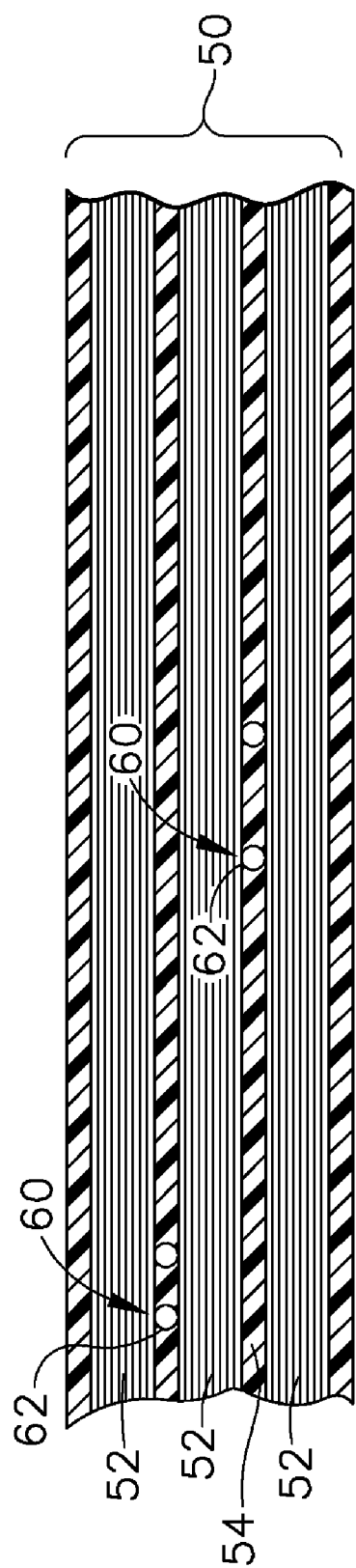
FIG. 3 is a schematic cross-section illustration of a portion of the fan containment case shown in FIG. 2.
Figure 4:
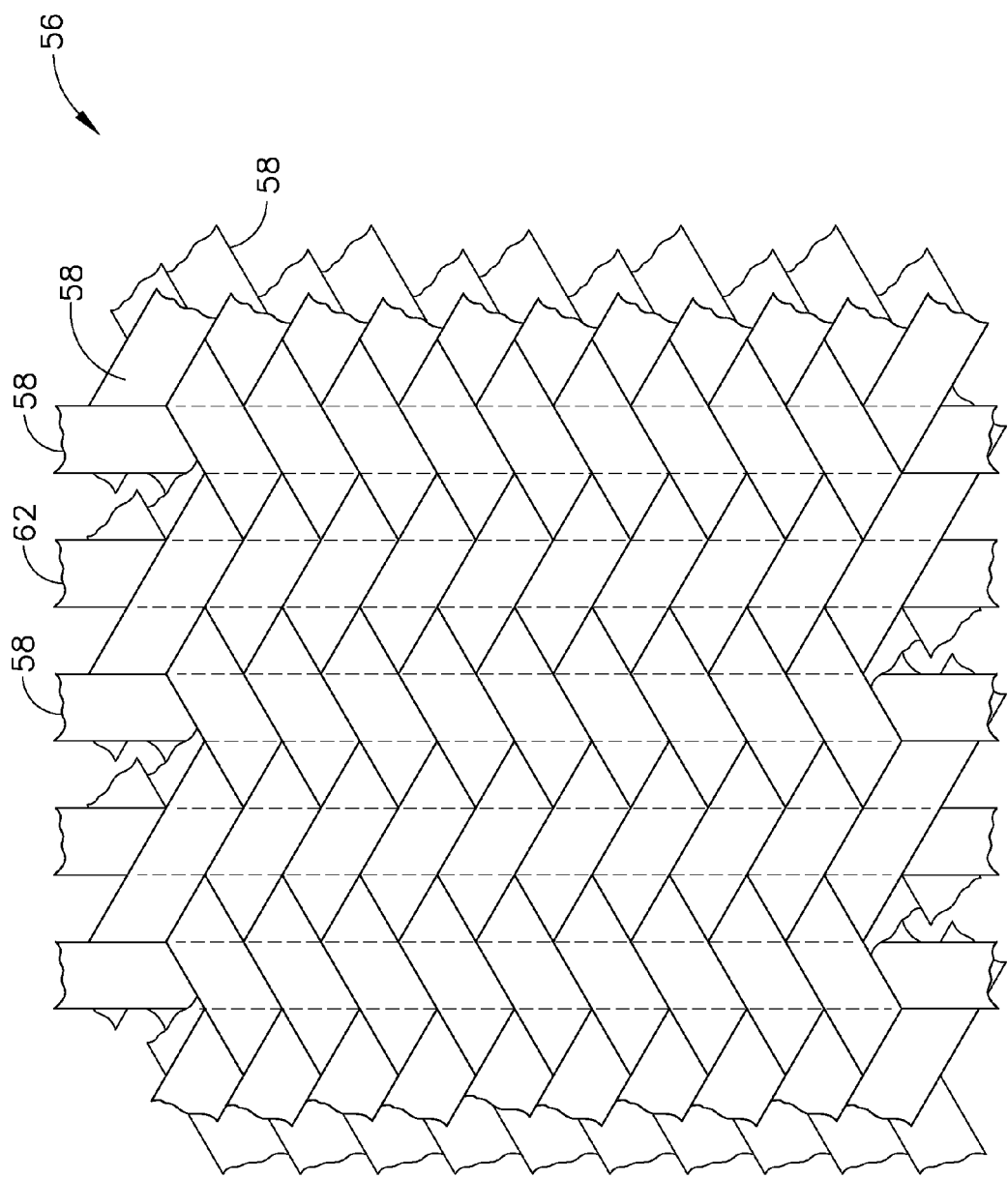
FIG. 4 is a schematic illustration of a braided mat of reinforcing fibers that may be used to form the containment case in FIG. 2

FIG. 2 is a schematic cross-section illustration of fan containment casing 40. FIG. 3 is an enlarged schematic cross-sectional illustration of a portion of fan containment case 40. FIG. 4 is a schematic illustration of a braided mat 56 of reinforcing fibers that may be used to form fan containment case 40. More specifically, in the exemplary embodiment, engine containment casing 40 is a cylindrically-shaped, hardwall containment system that has a length 42 that is approximately equal to a fan assembly length 44. More specifically, in the exemplary embodiment, containment casing 40 has a substantially circular cross-sectional area and its length 42 is variably selected to enable fan containment case 40 to circumscribe a prime containment zone 46 of fan assembly 12. Prime containment zone 46 is defined herein as a zone that extends both axially and circumferentially around fan assembly 12 and represents an area where a fan blade is most likely to be ejected from fan assembly 12.

In the exemplary embodiment, containment casing 40 includes a core 50 that is formed from a plurality of core layers 52 of reinforcing fibers, bonded together via a thermosetting polymeric resin 54. Each core layer 52 is made from a material that includes a plurality of braids of the reinforcing fibers. As shown in FIG. 4, in one embodiment, the reinforcing fibers are braided into a braided mat 56 in which the braids are substantially aligned in a circumferential direction. For example, in the exemplary embodiment, braids are formed by braiding fiber tows 58 containing between about 10,000 to about 30,000 fibers per tow. In alternate embodiments fiber tows 58 can contain less than about 10,000 fibers or greater than about 30,000 fibers, however, the strength of core 50 may be reduced when the tows contain less than 10,000 fibers, and the weight of containment casing 40 increases when fiber tows 58 contain greater than 30,000 fibers. It should be understood that in the exemplary embodiment core layers 52 and braided mat 56 are made from dry fiber preform materials.

It should also be appreciated that although the exemplary embodiment describes core layers 52 and braided mat 56 as dry fiber preform materials, in other embodiments, core layers 52 and braided mat 56 may be any prepreg preform material that enables fan containment casing 40 to function as described herein. It should further be understood that prepreg preform materials include a plurality of reinforcing fibers that have been impregnated with resin, but have not been cured.

Fan containment casing 40 may include at least one integral stiffening ring 60 that is formed with additional fiber tows 62 located between core layers 52. The additional fiber tows 62 may also be braided into core layers 52 to fix their location in core 50 as shown in FIG. 3. In the exemplary embodiment, the additional fiber tows 62 have a larger size than the fiber tows 58 used to form braided mat 56. Particularly, in the exemplary embodiment, the additional fiber tows 62 contain greater than about 30,000 fibers, and in another embodiment, the additional fiber tows 62 contain at least about 50,000 fibers.

Any suitable reinforcing fiber can be used to form fiber tows 58 and 62 in core layers 52, including, but not limited to, glass fibers, graphite fibers, carbon fibers, ceramic fibers, aromatic polyamid fibers, for example poly(p-phenylenetherephtalamide) fibers (KEVLAR fibers), and mixtures thereof. Moreover any suitable thermosetting polymeric resin can be used in forming core 50, for example, vinyl ester resin, polyester resins, acrylic resins, epoxy resins, polyurethane resins, and mixtures thereof.

Figure 5:
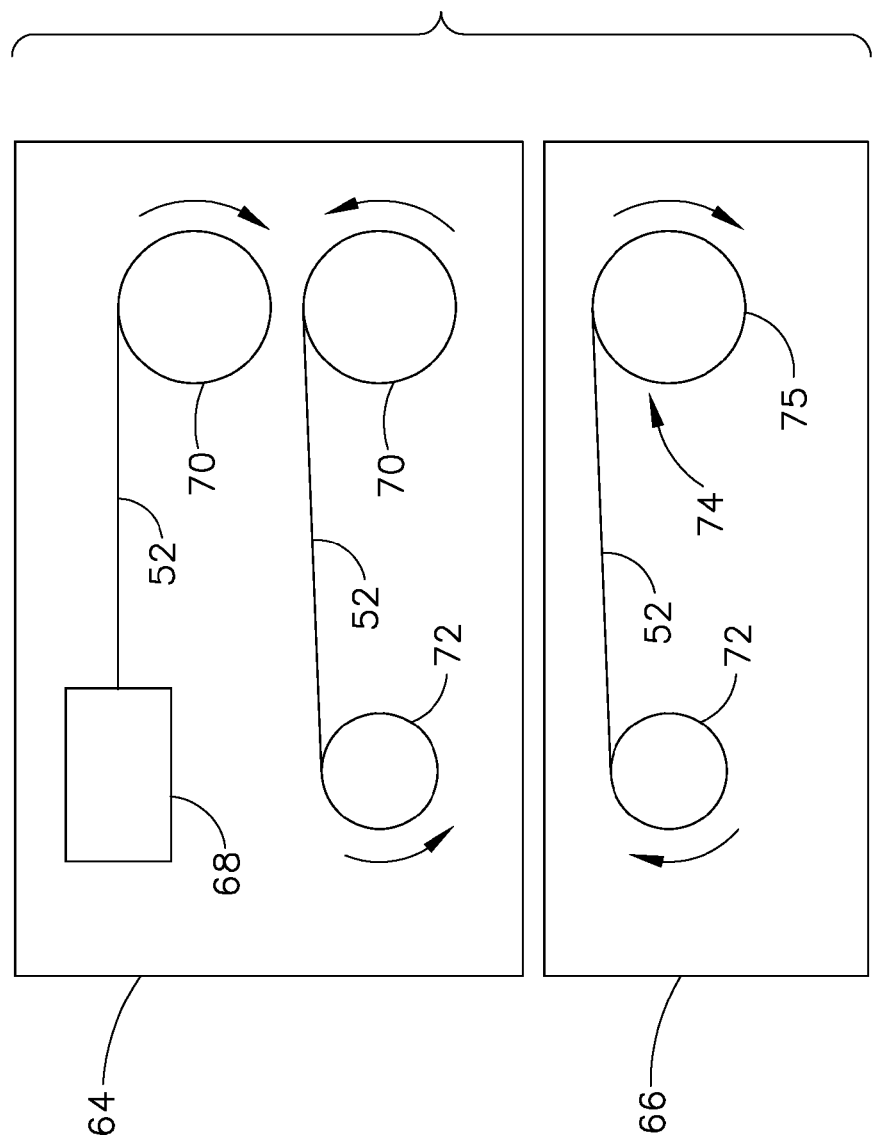
FIG. 5 is a schematic illustration of an exemplary fabrication process that may be used with the fan containment case shown in FIG. 2.

FIG. 5 is a schematic illustration of an exemplary fabrication process of fan containment casing 40. More specifically, in the exemplary embodiment, the fabrication process includes two stages, a fiber preforming stage 64 and a preform wrapping stage 66. During the fiber preforming stage 64, core layer 52 is fabricated using a fiber preforming machine 68 and then core layer 52 is wrapped around and substantially circumscribes a cylindrically-shaped take-up spool 70. Core layer 52 is then transferred from take-up spool 70 to a cylindrically-shaped shipping spool 72. More specifically, core layer 52 is unwound from take-up spool 70 and wrapped around shipping spool 72. Shipping spool 72 is then transported to a fan case manufacturer to implement preform wrapping stage 66.

During preform wrapping stage 66, core layer 52 is transformed to a cylindrically-shaped wrapping mandrel 74. More specifically, core layer 52 is unwound from shipping spool 72 and wrapped around wrapping mandrel 74. In the exemplary embodiment, core layer 52 is repeatedly wrapped around, and repeatedly circumscribes, mandrel 74 forming a plurality of layers. Each of the plurality of layers is bonded together using a thermosetting polymeric resin 54. Mandrel 74 functions as a mold, thus mandrel 74 also defines the desired size and shape of fan containment casing 40. Consequently, an inner surface 76 of fan containment case 40 is substantially identical and mirrors the exterior surface 75 of mandrel 74. It should be appreciated that in the exemplary embodiment, mandrel 74 has a substantially circular cross-sectional area that enables fabricating fan containment case 40 as described herein. Fiber tows 62 of stiffening rings 60, and thermosetting polymeric resin 54 are also wrapped around mandrel 74. Due to the cylindrical shape of mandrel 74, additional tension, as compared to the tension that may be applied using known fan containment case manufacturing methods, may be applied to core layers 52 during wrapping to facilitate reducing wrinkle development and reducing a bulk factor of fan containment case 40. The bulk factor is the ratio of the fan containment case wall thickness before curing, versus the fan containment case wall thickness after curing.

A vacuum is applied to the layered structure wrapped about mandrel 74 by any suitable method, for example vacuum bagging, and heat is applied to the structure to cure thermosetting polymeric resin 54. Heat is applied to the layered structure by any suitable method, for example, by placing the layered structure in a heat chamber, oven or autoclave. The vacuum causes polymeric resin to be impregnated into fiber mats 56 of core layers 52 and fiber tows 62 of stiffening rings 60 to facilitate increasing the structural strength of containment casing 40.

After curing, fan containment case 40 has a cylindrical shape that includes a substantially circular inner surface 76 and a substantial circular outer surface 78. Additionally, accessory mounting bracket 80 may be positioned on outer surface 78. A fluid flow path may be constructed on inner surface 76 by coupling acoustical panels 82 to inner surface 76. In the exemplary embodiment, acoustical panels 82 have an arcuate surface that faces the fluid flow path through gas turbine engine 10. It should be appreciated that the term "fluid" as used herein includes any material or medium that flows, including but not limited to, gas, air and liquid.

Fabricating cylindrical fan containment cases 40 with a substantially circular cross-sectional area facilitates eliminating technical difficulties associated with manufacturing conforming fiber preforms because the take-up spool, shipping spools and mandrel are cylindrical and have circular cross-sectional areas. Moreover, due to the mandrel's circular cross-sectional shape, during the wrapping process additional tension may be induced to the core layer material, to facilitate reducing the bulk factor and reducing wrinkle development of the fan containment case. Furthermore, using spools and a mandrel with circular cross-sections facilitates reducing manufacturing costs, facilitates increasing the number of prepreg preform suppliers will increase and enables using a simpler accessory mounting bracket.

In each embodiment, the above-described method using cylindrical spools and cylindrical mandrels facilitates reducing technical difficulties associated with manufacturing conforming fiber preforms and facilitates reducing wrinkle development. More specifically, in each embodiment, the spools and mandrels have circular cross-sections and are cylindrically shaped, so a conforming fiber preform is not produced. As a result, turbine operation facilitates reducing manufacturing costs and the bulk factor, and facilitates using a simpler accessory mounting bracket. Accordingly, gas turbine engine performance and component useful life are each facilitated to be enhanced in a cost effective and reliable manner.

Exemplary embodiments of methods for fabricating fan containment cases using cylindrical spools and mandrels are described above in detail. The method is not limited to use with the specific gas turbine engine embodiments described herein, but rather, the method can be utilized independently and separately from other methods described herein. Moreover, the invention is not limited to the embodiments of the method described above in detail. Rather, other variations of the method may be utilized within the spirit and scope of the claims.

While the invention has been described in terms of various specific embodiments, those skilled in the art will recognize that the invention can be practiced with modification within the spirit and scope of the claims.

What is claimed is:

1. A method of fabricating a fan containment case for a turbine engine, said method comprising:
   forming a core layer material having prepreg reinforcement;
   wrapping the core layer material about a cylindrically-shaped spool; and
   transferring the core layer material to a cylindrically-shaped mandrel by wrapping a plurality of layers of the core layer material about the mandrel such that the mandrel is circumscribed by the layers to facilitate defining a cylindrical shape of the fan containment case via the layers of core layer material, wherein an inner surface of the fan containment case is cylindrical at least along a prime containment zone defined by a portion of the fan containment case radially outward from the fan.

2. A method in accordance with claim 1 wherein transferring the core layer material to a cylindrically-shaped mandrel further comprises bonding each of the plurality of layers of the core layer material together using a thermosetting polymeric resin.

3. A method in accordance with claim 1 further comprising forming a flow path on the inner surface of the fan containment case.

4. A method in accordance with claim 1 further comprising positioning an accessory mounting bracket on an outer surface of the fan containment case.

5. A method in accordance with claim 1 wherein transferring the core layer material to a cylindrically-shaped mandrel further comprises inducing tension to the core layer material to facilitate reducing wrinkle development.

6. A system for fabricating a fan containment case, said system comprising:
   a core layer material comprising prepreg reinforcement;
   a cylindrically-shaped spool configured for wrapping said core layer material about said spool; and
   a cylindrically-shaped mandrel configured for wrapping a plurality of layers of said core layer material about said mandrel from said spool such that said mandrel is circumscribed by said plurality of layers to facilitate defining a cylindrical shape of the fan containment case via said plurality of layers such that the fan containment case has an inner surface, wherein the inner surface is cylindrical along a prime containment zone of the fan containment case.

7. A system in accordance with claim 6 wherein each of said plurality of layers is bonded together using a thermosetting polymeric resin.

8. A system in accordance with claim 6 further comprising acoustic treatments configured to be mounted within the fan containment case to define a flow path of the fan containment case.

9. A system in accordance with claim 6 further comprising an accessory mounting bracket configured to be mounted on an outer surface of the fan containment case.

10. A system in accordance with claim 6 wherein said core layer material is formed using a plurality of braids of reinforcing fibers.

11. A fan containment case for a turbine engine, said fan containment case comprising a cylindrical body comprising a plurality of circumferential layers of core layer material comprising prepreg reinforcement, said core layer material transferred from a cylindrically-shaped spool to a cylindrically-shaped mandrel to define an inner surface of said cylindrical body, said inner surface being cylindrical along a prime containment zone of said fan containment case.

12. A fan containment case in accordance with claim 11 wherein said plurality of circumferential layers of core layer material are bonded together using a thermosetting polymeric resin.

13. A fan containment case in accordance with claim 11 further comprising a plurality of acoustic treatments mounted on said inner surface and defining a flow path of said fan containment case.

14. A fan containment case in accordance with claim 11 further comprising an accessory mounting bracket mounted on an outer surface of said cylindrical body.

* * * * *